(12) United States Patent
Woo et al.

(10) Patent No.: US 11,388,005 B2
(45) Date of Patent: Jul. 12, 2022

(54) CONNECTED GATEWAY SERVER SYSTEM FOR REAL-TIME VEHICLE CONTROL SERVICE

(71) Applicant: Digiparts, Inc., Yongin-si (KR)

(72) Inventors: Hyuk Joon Woo, Yongin-si (KR); Sung Ill Jung, Yongin-si (KR); Jae Won Chang, Yongin-si (KR)

(73) Assignee: Digiparts, Inc., Yongin-si (KR)

( * ) Notice: Subject to any disclaimer, the term of this patent is extended or adjusted under 35 U.S.C. 154(b) by 329 days.

(21) Appl. No.: 16/617,129

(22) PCT Filed: Jul. 31, 2017

(86) PCT No.: PCT/KR2017/008248
§ 371 (c)(1),
(2) Date: Nov. 26, 2019

(87) PCT Pub. No.: WO2019/027061
PCT Pub. Date: Feb. 7, 2019

(65) Prior Publication Data
US 2020/0259655 A1 Aug. 13, 2020

(30) Foreign Application Priority Data
Jul. 31, 2017 (KR) .......... 10-2017-0097059

(51) Int. Cl.
*H04L 9/32* (2006.01)
*B60R 16/023* (2006.01)
(Continued)

(52) U.S. Cl.
CPC ........ *H04L 9/3213* (2013.01); *B60R 16/0231* (2013.01); *G06F 8/65* (2013.01);
(Continued)

(58) Field of Classification Search
CPC ... H04L 9/3213; H04L 12/66; H04L 63/0853; H04L 67/10; H04L 67/12; H04L 67/16;
(Continued)

(56) References Cited

U.S. PATENT DOCUMENTS 9,277,352 B1 3/2016 Ward
9,584,372 B2 2/2017 Bragstad et al.
(Continued)

FOREIGN PATENT DOCUMENTS

JP 2005/520725 A 7/2005
KR 2014-0119240 A 10/2014
(Continued)

OTHER PUBLICATIONS

Extended European Search Report dated Dec. 4, 2020 for European Application No. 17920263.5; 17 Pages.
(Continued)

*Primary Examiner* — Arvin Eskandarnia
(74) *Attorney, Agent, or Firm* — Daly Crowley Mofford & Durkee, LLP

(57) ABSTRACT

Provided is a connected gateway server system for real-time vehicle control service that includes a vehicle terminal mounted on at least one vehicle; a gateway server relaying communication with the vehicle terminal; a connected gateway server for controlling a vehicle and acquiring a vehicle information in the form of REST API for each user through communication with the vehicle terminal, delivering a control command, a response information, and the vehicle information to the user's platform that has been validated as an API form, storing a terminal connection state information, an API authentication information, the vehicle information, and a user information, and performing a confirmation of update state and an update request of vehicle terminal; and an user platform for verifying validity in an
(Continued)

API token manner through communication with the connected gateway server, fetching a necessary vehicle information in the API form or issuing the control command of vehicle.

10 Claims, 9 Drawing Sheets

(51) Int. Cl.
| | |
|---|---|
| G06F 8/65 | (2018.01) |
| G06F 9/54 | (2006.01) |
| H04L 12/66 | (2006.01) |
| H04L 9/40 | (2022.01) |
| H04L 67/10 | (2022.01) |
| H04L 67/12 | (2022.01) |
| H04L 67/51 | (2022.01) |
| H04L 69/16 | (2022.01) |
| H04L 43/0811 | (2022.01) |

(52) U.S. Cl.
CPC ............... *G06F 9/54* (2013.01); *H04L 12/66* (2013.01); *H04L 63/0853* (2013.01); *H04L 67/10* (2013.01); *H04L 67/12* (2013.01); *H04L 67/16* (2013.01); *H04L 69/162* (2013.01); *H04L 43/0811* (2013.01)

(58) Field of Classification Search
CPC . H04L 69/162; G06F 8/65; G06F 9/54; B60R 16/0231
See application file for complete search history.

(56) References Cited

U.S. PATENT DOCUMENTS

| | | | |
|---|---|---|---|
| 2009/0021385 A1* | 1/2009 | Kelty | B60L 55/00 |
| | | | 340/660 |
| 2014/0297809 A1 | 10/2014 | Kim | |
| 2015/0127388 A1 | 5/2015 | Oldham | |
| 2016/0028688 A1 | 1/2016 | Chizhov et al. | |
| 2016/0212253 A1* | 7/2016 | Akama | G01C 21/3664 |
| 2017/0094527 A1* | 3/2017 | Shattil | H04W 12/122 |
| 2017/0161486 A1 | 6/2017 | Jeon et al. | |
| 2018/0196427 A1* | 7/2018 | Majumdar | B60W 40/09 |
| 2018/0198846 A1* | 7/2018 | Srinivasan | H04L 63/0428 |

FOREIGN PATENT DOCUMENTS

| | | |
|---|---|---|
| KR | 2014-0143485 A | 12/2014 |
| KR | 10-1686417 B1 | 12/2016 |

OTHER PUBLICATIONS

Japanese Office Action (with Machine English Translation from Espacenet.com) dated Jan. 5, 2021 for Japanese Application No. 2019-564924; 4 Pages.

KT, "GIGA IoT Vehicle FMS/DTG Service;" PowerPoint Presentation with an English Abstract only; Mar. 2017; 22 Pages.

PCT International Search Report dated Apr. 24, 2018 for International Application No. PCT/KR2017/008248; 4 Pages.

* cited by examiner

CONNECTED GATEWAY SERVER SYSTEM FOR REAL-TIME VEHICLE CONTROL SERVICE

CROSS-REFERENCE TO RELATED APPLICATION

This present application is a national stage filing under 35 U.S.C § 371 of PCT application number PCT/KR2017/008248 filed on 31 Jul. 2017 which is based upon and claims the benefit of priority to Korean Patent Application No. 10-2017-0097059 filed on 31 Jul. 2017 in the Korean Intellectual Property Office. The disclosures of the above-listed applications are hereby incorporated by reference herein in their entirety.

BACKGROUND

1. Technical Field

The present invention relates to a connected gateway server system for a real-time vehicle control service, and more particularly, to the connected gateway server system for a real-time vehicle control service (for car sharing and vehicle control service) to provide a state of vehicle and a use information in the form of REST (Representational State Transfer) API (Application program Interface) communicating with a server through an IoT (Internet of Things) terminal attached to the vehicle.

2. Discussion of the Related Art

With the recent global interest in sharing economy, the market for car sharing is steadily increasing.

Therefore, the number of companies that want to subscribe to a vehicle control system (ex: Fleet Management System (FMS)) are increasing now. The vehicle control system can provide the current position and the state information of vehicle on the IoT terminal attached to the vehicle. By using such information, it is possible to prevent an accident of vehicle, reduce an insurance premium, and increase a residual value of vehicle.

Generally, the car sharing service system and the vehicle control system are composed of a communication terminal (for example, Internet Of Things terminal) for collecting the location and the operation information of vehicle, and a control server for collecting the driving information and controlling the vehicle.

In this regard, Korean Patent Registration No. 10-1686417 (Title: Gateway server system for providing a connecting maintenance between a control server and terminal of vehicle in the 3G/LTE wireless networks and control method thereof, hereinafter as 'Patent Document 1'), developed and filed by the applicant, discloses a technology that can continuously maintain the connection state between the IoT terminal and the control server in the IP-based communication environment by detecting the disconnection of the data communication with the control server due to the change of the IP address of the terminal.

In this, we proposed solutions to the problems of existing vehicle control system, such as, a weakness of SMS (Short Message Service) control method, a lack of security and a slow transmission speed.

However, such a vehicle control system has a disadvantage in that it requires a separate development and management because the communication system, the structure of the control server, and the security system are different according to each mobile communication company.

In the existing vehicle control system, the IP (Internet Protocol) addresses are changed frequently due to the mobility of the vehicle. Hence, the IP based communication is only used to transmit information to the control server. The dual structures communication using the SMS protocol and IP address are mainly used for vehicle control.

In the vehicle control using the SMS protocol, there is a possibility that an arbitrary third party may control the vehicle through forgery of the SMS. Moreover, the vehicle control using SMS protocol has disadvantages such as an increase in SMS cost imposed for a command transmission, a confirmation of information reception for vehicle control, and a long transmission time (10 to 14 seconds). Accordingly, it is limited in updating the vehicle control terminal and transmitting a large amount of data due to the shortage of the capacity of the SMS (80 bytes).

SUMMARY

To solve the above problems and defects, it is an object of the present invention to provide a connected gateway server system for a real-time vehicle control service that can a vehicle to be managed in a REST API form and to quickly build a platform composed only of function (API calls) desired by the customer, in order to complement the inefficiency of the existing vehicle control system, which had to be independently developed and managed for each service user or customer.

It is another object of the present invention to provide the connected gateway server system for the real-time vehicle control service capable of collectively updating the control communication terminals by applying the integrated and unidirectional IP communication method.

To accomplish the above and objects of the present disclosure, there is provided a connected gateway server system for real-time vehicle control service that includes A connected gateway server system for real-time vehicle control service comprising: a vehicle terminal mounted on at least one vehicle; a gateway server relaying communication with the vehicle terminal; a connected gateway server for controlling a vehicle and acquiring a vehicle information in the form of REST API for each user through communication with the vehicle terminal, delivering a control command, a response information, and the vehicle information to the user's platform that has been validated as an API form, storing a terminal connection state information, an API authentication information, the vehicle information, and a user information, and performing a confirmation of update state and an update request of vehicle terminal; and a user platform for verifying validity in an API token manner by communication with the connected gateway server, fetching the necessary vehicle information in the API form or issuing the control command of vehicle.

According to a preferred embodiment of the present disclosure, wherein the connected gateway server may include a plurality of terminal connection servers for transmitting a connection state of the vehicle terminal or the vehicle information received from the vehicle terminal by a socket communication with a gateway server and a transmission/reception management server to the transmission/reception management server, or storing the information in a database server, the transmission/reception management server which is connected to a terminal connection server by the socket communication and is connected to a central management server by a HTTP communication, for transmitting the vehicle control command received from the central management server to the vehicle terminal through the terminal connection server, and for transmitting the collected vehicle data information to the central management server by collecting the response information of the vehicle data information and the control command from the terminal connection server, wherein the response information of the control command is used to check the normal or abnormal connection state by referring to the terminal connection state information of the database server, the central management server for transmitting the control command, the response information of the control command, and the vehicle data information through a validity authentication between the user platform and the transmission/reception management server in the form of API in both directions, the database server for receiving and storing the terminal connection state information, the API authentication information, the vehicle data information, and the user information through the terminal connection server and the central management server, and a FOTA server which includes a firmware database server and stores a firmware update file, for receiving the firmware update start request transmitted from the vehicle terminal and accordingly transmitting the firmware update file to the vehicle terminal through the firmware database server and performing the update of the terminal state confirmation.

In an embodiment of the present disclosure, the connected gateway server may be configured by dispersing each server according to functions and purposes.

In an embodiment of the present disclosure, the terminal connection server may include a connection manager which is connected to the gateway server by the socket communication to check the normal or abnormal connection state with the vehicle terminal, for storing or deleting the terminal connection state information to the database server and for transmitting the control command received from a tunnel server of the transmission/reception management server through the gateway server to the corresponding vehicle terminal by referring to the terminal connection state information of the database server, a receiver for transmitting the vehicle data information received from the vehicle terminal and the response information of control command by the socket communication to the tunnel server of the transmission/reception management server, and a sender for transmitting the vehicle data information received from the vehicle terminal and the response information of control command to the tunnel server of the transmission/reception management server by socket communication.

In an embodiment of the present disclosure, wherein the transmission/reception management server may include the tunnel server for transmitting the response information of control commend to a push manager and transmitting the vehicle data information and the response information of control command through a API tunnel to a vehicle information transfer unit of the central management server by the HTTP communication, the push manager for confirming the normal or abnormal connection state by referring to the response information of control command received from the tunnel server and the terminal connection state information of the database server and transmitting the control command to the terminal connection server by the socket communication by transmitting the control command to the tunnel server according to a result of the connection state check, or attempting communication with the corresponding vehicle terminal using a spare control path, and the API tunnel for transmitting the vehicle data information and the response information of control command from the tunnel server to the vehicle information transfer unit of the central management server by the HTTP communication.

In an embodiment of the present disclosure, the central management server may include the vehicle information transferring unit for storing the vehicle data information transmitted from the tunnel server of the transmission/reception management server through the API tunnel of the database server, for transmitting the response information of control command that has been authenticated by the API authentication unit to the user platform directly, after the vehicle data information is transmitted from the vehicle terminal to the HTTP protocol of the central management server, the API authentication unit for performing API authentication of the response information to the control command transmitted to the HTTP protocol of the central management server and the control command transmitted from the user platform, and the vehicle command control unit for converting the vehicle control command transmitted from the user platform and authenticated by the API authentication unit into a terminal dedicated command and transmitting the command to the transmission/reception management server.

In an embodiment of the present disclosure, when a normal connection is established with the vehicle terminal, the connection manager record may the terminal connection state information in the database server, transmit the connection state information to the tunnel server of the transmission/reception management server through the sender, and when the abnormal connection is established with the vehicle terminal, the connection manager may delete the connection state information of the database server.

In an embodiment of the present disclosure, when the response information of control command is normal or the connection state information of the terminal presents in the database server, the push manager nay transmit the control command to the tunnel server and the control command to the terminal connection server by the socket communication, or when no connection state information of the corresponding terminal presents in the database server, the push manager may attempt to communicate with the corresponding vehicle terminal using either the cloud message service or the short message service and when the response information of control command received from the tunnel server is abnormal, the push manager may retry the connection to the tunnel server a predetermined number of times, or even if the connection is not made and the predetermined number of times exceeds, try to communicate with the corresponding vehicle terminal using either the cloud messaging service or the SMS message as any one of spare control processes.

In an embodiment of the present disclosure, the user platform may perform a token acquisition procedure and a new token acquisition procedure after the token expiration for using the API by communication with the connected gateway server and the procedure of acquiring the API information by using the token obtained through the token acquisition procedure.

In an embodiment of the present disclosure, the token acquisition procedure of the user platform may include the step of that the user platform requiring the token acquisition sends the encrypted information composed of the customer ID, the time information, and the private key, the customer ID, and the time information together to the API authentication unit of the central management server, and transmit the time information to the API authentication unit of the central management server to request the token issuance, and the step of that the API authentication unit of the central management server may determine whether the received time information and the customer ID coincide with the user platform's information after checking the validity of the encrypted information, and when the determination is completed, the API authentication unit of the central management server may issue a token and transmit the issued token and the additional information (the current token, the expiration date, and next token information) to the corresponding user platform.

In an embodiment of the present disclosure, the new token acquisition procedure after expiring the used token may include the step of that the user platform requiring the acquisition of the new token transmits the encrypted information composed of the token information, the time information, and the private key, the existing token information, the token information to be used next, and the time information, to the API authentication unit of the central management server to request a new token issuance after checking the validity of the encrypted information, and the step of that the API authentication unit of the central management server determines whether the received time information match the token information to be used coincide with the user platform's information, and when the determination is completed, the API authentication unit of the central management server may issue a new token and transmit the newly issued token and the additional information (the current token, the expiration date, and the next token information) to the corresponding user platform.

In an embodiment of the present disclosure, the API information acquisition procedure of the user platform using the token acquired through the token acquisition procedure may include the step of that the corresponding user platform requiring the API information acquisition calls the API to request vehicle control/data by transmitting the encrypted information composed of the time information, the token information, and the private key, the time information and the token information to the central management server, after checking the validity of the encrypted information, and the step of that the API authentication unit of the central management server determines whether the received time information and the token information to be used coincide with the user platform's information and when the determination is completed, the API authentication unit of the central management server may call the corresponding API (the control execution, the control result and the data) and transmit the API to the corresponding user platform.

According to the connected gateway server system for real-time vehicle control service can be performed a unified management throughout the service operation. When a new function is added, a single standardized API design can provide services to various clients in an independent form. Therefore, the time and cost required for development can be reduced.

In addition, the present invention can be utilized in vehicle control, car sharing and vehicle control service (FMS) and other vehicle related services (automobile insurance etc.) through a standardized REST API system. The customer selects only necessary functions among the functions provided in the API form in the present system, and makes it possible to implement the service simply in the own platform.

According to the present invention, unlike in the past, which was updated the terminals by direct access to vehicles distributed throughout nationwide, it is possible to perform by collective updating and version management of terminals installed in all vehicles by utilizing terminal connection server and FOTA (Firmware Over The Air) server designed to enable IP communication in both directions. Therefore, it is possible to respond in real time when an error occurs in the terminal, and the service maintenance/repair cost can be greatly reduced.

In addition, according to the present invention, even in system, the servers are dispersed by functions and purposes such as a plurality of terminal connection management servers, a transmission/reception server, a central management server, a database server, and an FOTA server. In case of a system failure, it is possible to immediately identify the server where the problem occurred and to enable quick response.

DETAILED DESCRIPTION OF THE EMBODIMENTS

Figure 1:
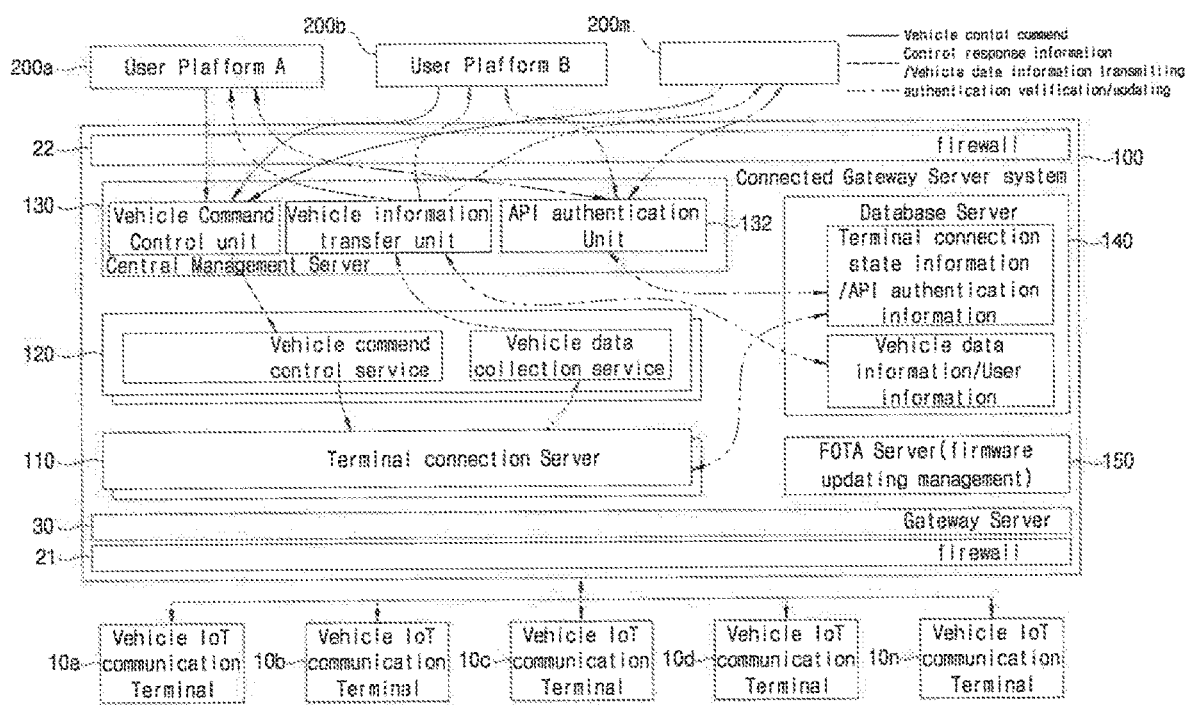
FIG. 1 is a block diagram schematically illustrating an overall configuration of a connected gateway server system according to the present invention.

A configuration and operation of a connected gateway server system for a real-time vehicle control service according to a preferred embodiment of the present invention will be described in detail with reference to the accompanying drawings.

Hereinafter, exemplary embodiments of the present disclosure will be described in detail with reference to the accompanying drawings, which will be readily apparent to those skilled in the art to which the present disclosure pertains. The present disclosure may be embodied in many different forms and is not limited to the embodiments described herein. In the drawings, parts not relating to the description are omitted for clarifying the present disclosure, and the same reference numerals are assigned to the same or similar components throughout the specification.

Figure 2:
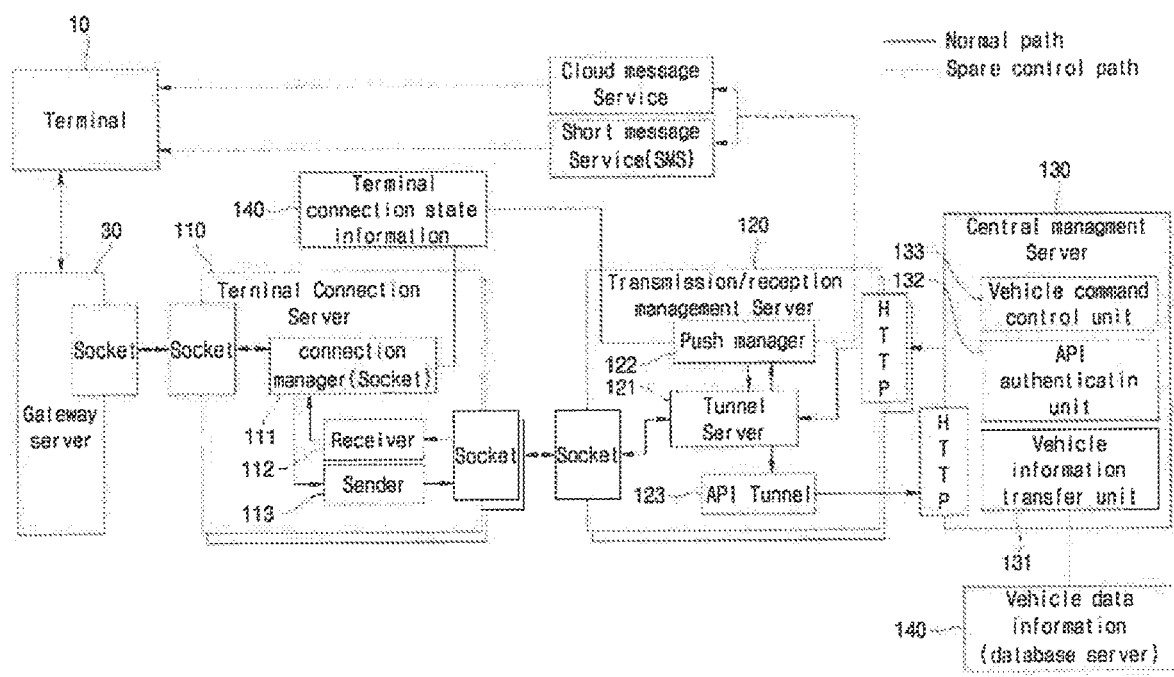
FIG. 2 is a block diagram illustrating the connection relationship and internal configuration among the terminal connection server, the transmission/reception management server, and the central management server in the connected gateway server of FIG. 1.

FIG. 1 is a block diagram schematically illustrating an overall configuration of a connected gateway server system for a real-time vehicle control service according to a preferred embodiment of the present invention. FIG. 2 is a block diagram illustrating the connection relationship and internal configuration among the terminal connection server, the transmission/reception management server, and the central management server in the connected gateway server 100 of FIG. 1. As illustrated in the figure, the connected gateway server system according to the present invention includes a vehicle terminal 10 mounted on at least one vehicle, a gateway server 30 for relaying communication with the vehicle terminal 10, a connected gateway server 100 for remotely controlling the vehicle in the form of REST API for each user through communication with the vehicle terminal 10, and a user platform 200 for fetching necessary a control command, a response information, and a vehicle information by the communication with the connected gateway server 100 in an API form or issuing the vehicle control command.

The vehicle terminal 10 may be configured as any one of a plurality of vehicle IoT communication terminals 10a-10n mounted on at least one vehicle, and perform IP (Internet protocol) communication through the 3G or LTE communication network.

The gateway server 30 may relay IP communication between the vehicle terminal 10 and the connected gateway server 100 through the 3G or LTE communication network. The gateway server 30 may include a firewall 21 for communication security with the vehicle terminal 10.

The connected gateway server 100 may remotely control the vehicle in the form of RESTAPI for each user by the communication with the vehicle terminal 10 or acquire the vehicle information (for example, state information and utilization information). The connected gateway server 100 may authenticate the validity of the user platform 200 and transmit the control command, the response information, and the vehicle information of the vehicle terminal to the user platform 200 that has been validated as an API. The connected gateway server 100 may store terminal a connection state information, an API authentication information, a vehicle data information, and a user information and perform update a state confirmation and a update request of the vehicle terminal. To this end, the connected gateway server 100 may include a plurality of terminal connection servers 110, a transmission/reception management server 120, a central management server 130, a database server 140, and a Firmware over the Air (FOTA) server 150.

The connected gateway server 100 may be provided with a firewall 22 for communication security with the user platform 200. Also, the connected gateway server 100 may be configured such that each server is dispersed according to functions and purposes as illustrated in FIG. 1.

The terminal connection server 110 may communicate with the gateway server 30 and the transmission/reception management server 120 by the socket communication to check the connection state with the vehicle terminal 10. The terminal connection server 110 may transmit the vehicle information (the vehicle data information or the response information of control command) received from the vehicle terminal 10 to the transmission/reception management server 120 and store the vehicle information to the database server 140. The terminal connection server 110 may be composed of one or more servers. The terminal connection server 110 may include a connection manager 111, a receiver 112, and a sender 113 for implementing the functions.

The connection manager 111 may be connected to the gateway server 30 by the socket communication to check whether the connection with the vehicle terminal 10 is normal or abnormal and record or delete the terminal connection state information in the database server 140. The connection manager 111 may transmit the control command received from a tunnel server 121 of the transmission/reception management server 120 to the corresponding vehicle terminal 10 through the gateway server 30 and the receiver 112, referring to the terminal connection state information of the database server 140.

The connection manager 111 may record the terminal connection state information in the database server 140, transmit the connection state information to the tunnel server 121 of the transmission/reception management server 120 through the sender 113 and transmits the vehicle data information and the response information of control command. When the abnormal connection with the vehicle terminal 10 is established, the connection state information of the database server 140 is deleted.

The receiver 112 may transmit a vehicle control command received from the tunnel server 121 of the transmission/reception management server 120 to the connection manager 111 by the socket communication.

The sender 113 may transmit two types of information (the vehicle data information and the response information of control command) received from the vehicle terminal 10 to the tunnel server 121 of the transmission/reception management server 120 by the socket communication.

The transmission/reception management server 120 may perform a vehicle command control service and a vehicle data collection service. To this end, the transmission/reception management server 120 may be connected to the terminal connection server 110 by the socket communication, connected to a central management server 130 by HTTP communication, and transmit the vehicle control command, which is received from the central management server 130, and transmit the vehicle control command to the vehicle terminal 10 through the connection server 110. In addition, the terminal connection server 110 may collect the response information of the vehicle data information and the control command. The collected vehicle data information may be transmitted to the central management server 130, and the response information of control command may be used to check the normal or abnormal connection state by referring to the terminal connection state information of the database server 140.

In order to implement this function, the transmission/reception management server 120 may include a tunnel server 121, a push manager 122, and an API tunnel 123.

The tunnel server 121 may transfer the response information of control command to the push manager 122. The tunnel server 121 may transmit the vehicle data information and the response information of control command by the HTTP communication to a vehicle information transfer unit 131 of the central management server 130 through the API tunnel 123.

The push manager 122 may confirm the normal or abnormal connection state by referring to the response information of control command received from the tunnel server 121 and the terminal connection state information of the database server 140. The push manager 122 may transmit the control command (information) to the tunnel server 121 according to the result of the connection state check and transmit the control command (information) to the terminal connection server 110 by the socket communication or attempt communication with the corresponding vehicle terminal 10 using a spare control path.

The push manager 122 may transmit the control command to the tunnel server 121 and transmit the control command to the terminal connection server 110 by the socket communication when the response information of control command is normal, or the connection state information of the terminal presents in the database server 140. When no connection state information of the corresponding terminal presents in the database server 140, the push manager 122 may attempt to communicate with the corresponding vehicle terminal 10 using either the cloud message service or the short message service. When the response information of control command received from the tunnel server 121 is abnormal, the push manager 122 may retry the connection to the tunnel server 121 a predetermined number of times. The push manager 122 may try to communicate with the corresponding vehicle terminal 10 using either the cloud messaging service or the SMS message as a spare control path.

The API tunnel 123 may transmit the response information of the vehicle data information and the control command to the vehicle information transfer unit 131 of the central management server 130 by the HTTP communication in the tunnel server 121.

The central management server 130 may transmit the control command the response information of control command, and the vehicle data information in the form of API in both directions according to the validity authentication between the user platform 200 and the transmission/reception management server 120.

The central management server 130 may include the vehicle information transfer unit 131, an API authentication unit 132, and a vehicle command control unit 133 for implementing the functions.

The vehicle information transferring unit 131 may store the vehicle data information transmitted from the tunnel server 121 of the transmission/reception management server 120 through the API tunnel 123 in the database server 140. Alternatively, after the vehicle data information is transmitted from the vehicle terminal 10 to the HTTP protocol of the central management server 130, the vehicle information transfer unit 131 may transmit the response information of control command that has been authenticated by the API authentication unit 132 to the user platform 200 directly.

The API authentication unit 132 may perform API authentication the response information of control command transmitted to the HTTP protocol of the central management server 130 and the control command transmitted from the user platform 200.

The vehicle command control unit 133 may convert the vehicle control command transmitted from the user platform 200 and authenticated by the API authentication unit 132 into the terminal dedicated command and transmit the command to the transmission/reception management server 120.

The database server 140 may receive and store the terminal connection state information, the API authentication information, the vehicle data information, and the user information through the terminal connection server 110 and the central management server 130.

The FOTA server 150 may include a firmware database server 151 to store a firmware update file. The FOTA server 150 may receive a firmware update request transmitted from the vehicle terminal 10 and accordingly transmit the firmware update file to the vehicle terminal 10 via the firmware database server 151 and perform the update of the terminal state and the update request.

The user platform 200 may comprise one of user platforms 200a-200m or an administrator platform. The user platform 200 may verify its validity in an API token manner through bidirectional communication with the connected gateway server 100. After authentication, the user platform 200 may fetch necessary vehicle information in the form of the API, or give the control command to the vehicle.

To this end, the user platform 200 may perform a token acquisition procedure and a renewal token acquisition procedure after the token expiration for using the API through communication with the connected gateway server 100. The user platform 200 may perform the procedure of acquiring API information by using the token obtained through the token acquisition procedure.

The token acquisition procedure of the user platform may include the step of that the user platform 200 requiring the token acquisition sends the encrypted information composed of the customer ID, the time information, and the private key, the customer ID, and the time information together to the API authentication unit 132 of the central management server 130, and transmits the time information to the API authentication unit 132 of the central management server 130 to request the token issuance, and the step of that the API authentication unit 132 of the central management server 130 determines whether the received time information and the customer ID coincide with user platform's information after checking the validity of the encrypted information, and when the determination is completed, the API authentication unit 132 of the central management server 130 issues a token and transmits the issued token and the additional information (the current token, the expiration date, and next token information) to the corresponding user platform 200.

The new token acquisition procedure after expiring the used token may include the step of that the user platform 200 requiring the acquisition of the new token transmits the encrypted information composed of the token information, the time information, and the private key, the existing token information, the token information to be used next, and the time information, to the API authentication unit 132 of the central management server 130 to request the new token issuance after checking the validity of the encrypted information, and the step of that the API authentication unit 132 of the central management server 130 determine whether the received time information match the token information to be used coincide with the user platform's information, and when the determination is completed, the API authentication unit 132 of the central management server 130 issues the new token and transmit the renewal token and the additional information (the current token, the expiration date, and the next token information) to the corresponding user platform 200.

The API information acquisition procedure of the user platform using the token acquired through the token acquisition procedure may include the step of that the corresponding user platform 200 requiring the API information acquisition may call the API to request vehicle control/data by transmitting the encrypted information composed of the time information, the token information, and the private key, the time information and the token information to the central management server 130, after checking the validity of the encrypted information, and the step of that the API authentication unit 132 of the central management server 130 determines whether the received time information match the token information to be used coincide with the user platform's information and when the determination is completed, the API authentication unit 132 of the central management server 130 calls the corresponding API (the control execution, the control result and the data) and transmits the API to the corresponding user platform 200.

Detailed operation and effect of the connected gateway server system for the real-time vehicle control service according to the present invention will be described below.

Figure 3A:
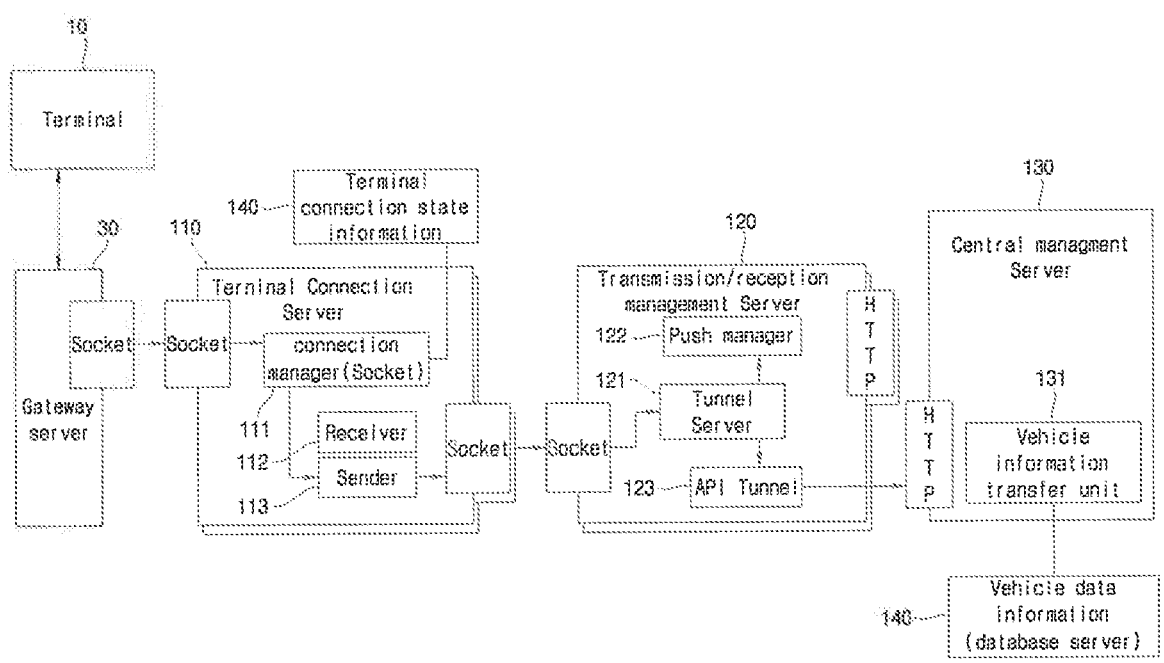
FIG. 3A is a detailed flowchart illustrating a processing of the vehicle data information and the response information for the control command acquired by the connected gateway server 100 of FIG. 1.

FIG. 3A may be a detailed flowchart illustrating a processing of the vehicle data information and the response information for the control command acquired by the connected gateway server 100 of FIG. 1. As shown in FIG. 3A, the connected gateway server 100 may transmit the information (the vehicle data information and the response information for the control command) acquired from the vehicle terminal 10 to the connection manager 111 of the terminal connection server 110 through the gateway server 30 by applying the socket communication ensuring regular connectivity.

The terminal connection server 110 may record the terminal connection state information in the database server 140 through the connection manager 111 when the normal connection is established with the vehicle terminal 10. The terminal connection server 110 may transmit the above two types of information (the vehicle data information and the response information for control command) to the tunnel server 121 of the transmission/reception management server 120 through a sender 113.

When an abnormal connection is established, the terminal connection server 110 may delete the connection state information of the database server 140 through the connection manager 111.

The tunnel server 121 of the transmission/reception management server 120 may transmit response information of the vehicle data information and the control command to the vehicle information transfer unit 131 of the central management server 130 through the API tunnel 123 via HTTP communication. The vehicle data information may be stored in the database server 140 through the vehicle information transfer unit 131. The response information for control command may be directly transmitted to the user platform 200 through the authentication of the API authentication unit 132.

The tunnel server 121 of the reception management server 120 may transmit the response information for control command to the push manager 122 so that the push manager 122 may confirm the normal connection state or abnormal connection state by referring to the terminal connection state information of the database server 140.

Figure 3B:
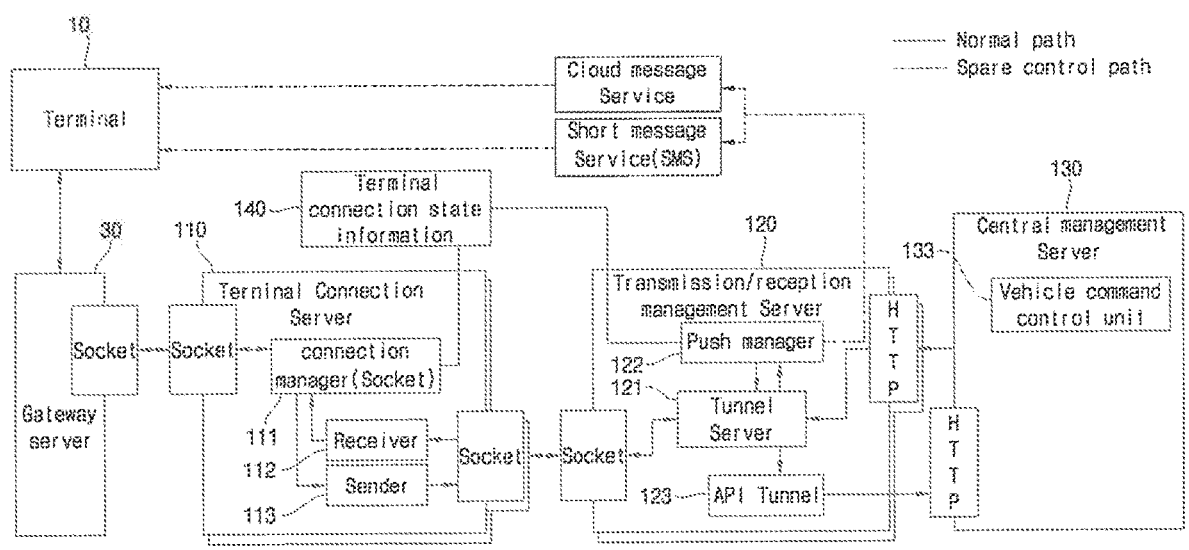
FIG. 3B may be a flowchart illustrating a vehicle control process in which the connected gateway server 100 of FIG. 1 gives a control command to the vehicle terminal 10.

FIG. 3B may be a flowchart illustrating a vehicle control process in which the connected gateway server 100 of FIG. 1 gives a control command to the vehicle terminal 10. The connected gateway server 100 may transmit the control command (information) acquired by the vehicle command control unit 133 of the central management server 130 to the tunnel server 121 of the transmission/reception management server 120 via HTTP communication. The tunnel server 121 may transmit the control command (information) to the push manager 122.

Here, the push manager 122 may check whether the response information for the control command received from the tunnel server 121 is normal and the terminal connection state information presents in the database server 140. When the response information for the control command received from the tunnel server 121 is normal and the terminal connection state information presents in the database server 140, the push manager 122 may transmit a control command (information) to the tunnel server 121 and a control command (information) to the terminal connection server 110 by the socket communication.

The push manager 121 may attempt to communicate with the corresponding vehicle terminal 10 using a backup control process such as a cloud message service or a short message service when the connection state information of the corresponding terminal is not present in the database server 140.

When the response information for control command received from the tunnel server 121 is abnormal, the push manager 122 may retry the connection to the tunnel server 121 a predetermined number of times. when the connection to the tunnel server 121 may not be established while the predetermined number of times is exceeded, the push manager 121 may try to communicate with the corresponding vehicle terminal 10 using a backup control process such as a cloud message service or a short message service.

After receiving the cloud messaging service or the short message service, the vehicle terminal 10 may transmit the normal reception state to the push manager 122. When it is abnormal, the vehicle terminal 10 may retry a predetermined number of times.

The terminal connection server 110 that has received the control command (information) from the tunnel server 121 of the transmission/reception management server 120 by the socket communication may transmit the received control command (information) to the connection manager 111. The connection manager 111 may refer to the terminal connection state information of the database server 140 and issue a control command to the vehicle terminal 10 through the gateway server 30.

Figure 4:
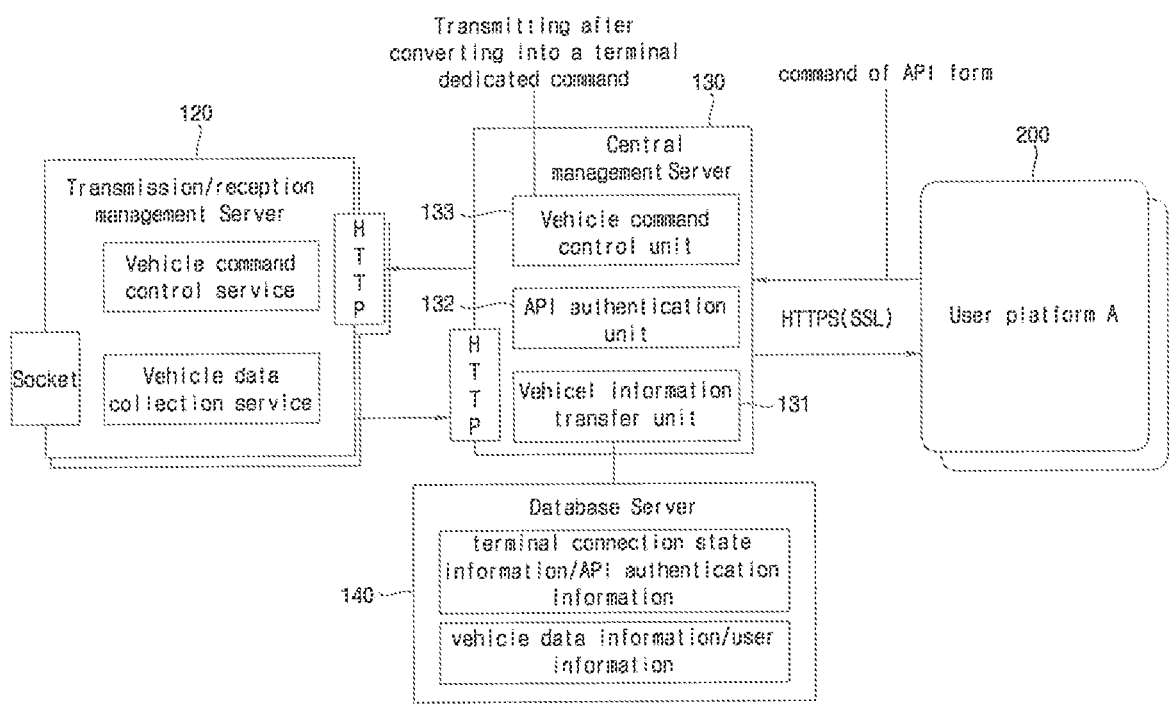
FIG. 4 is a flowchart illustrating a process in which the user platform acquires vehicle information and a process of issuing a control command to the vehicle.

FIG. 4 is a flowchart illustrating a process of the user platform 200 obtaining vehicle information and a process of issuing a control command to the vehicle. As shown in FIG. 4, the response information for control command transmitted from the vehicle terminal 10 to the HTTP protocol of the central management server 130 is transmitted to the user platform 200 directly from the vehicle information transfer unit 131 after being authenticated by the API authentication unit 132. The vehicle data information may be extracted from the database server 140, authenticated by the API authentication unit 132, and transmitted to the user platform 200.

The vehicle control command transmitted from the user platform 200 may be authenticated by the API authentication unit 132 of the central management server 130 and then converting into a terminal dedicated command from the vehicle command control unit 133 and transmitted to the transmission/reception management server 120.

If there is a database server in the user platform 200, the user platform 200 may receive the vehicle data information in API form. If there is no database server on the user platform 200, the user platform 200 may poll the data periodically called by the user.

Figure 5:
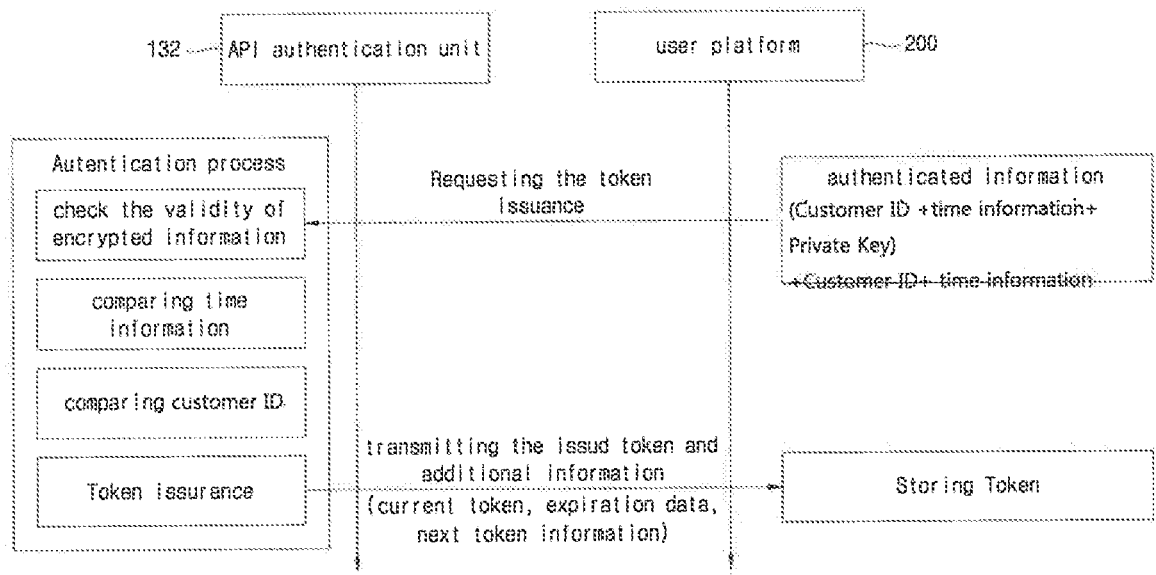
FIG. 5 is a flowchart illustrating a token acquisition procedure of a user platform for API use.
Figure 6:
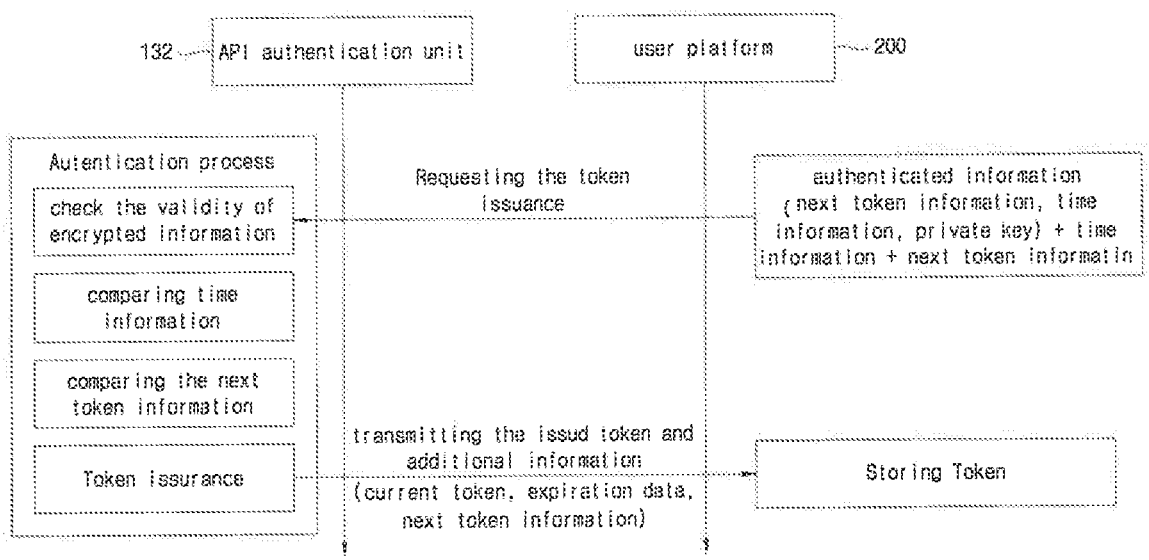
FIG. 6 is a flowchart illustrating a new token acquisition procedure after the token expiration of the user platform for API use.
Figure 7:
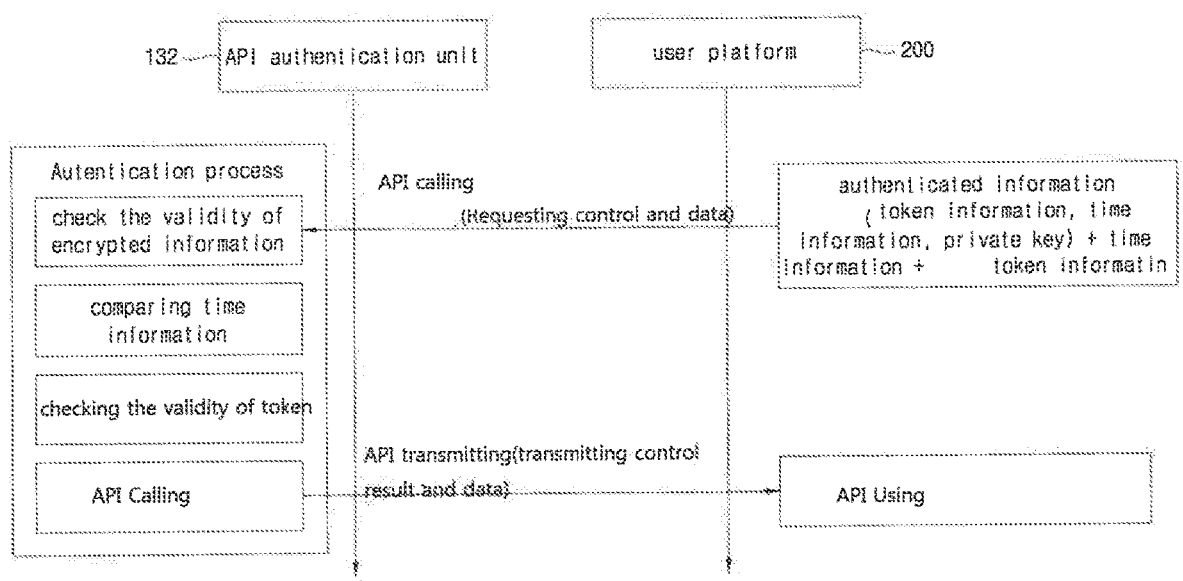
FIG. 7 is a flowchart illustrating an API information acquisition procedure of the user platform using the token obtained through the procedure of FIG. 5 or FIG. 6.

FIG. 5 is a flowchart illustrating the token acquisition procedure of the user platform (or the administrator platform) for API use. FIG. 6 may be a flowchart illustrating a new token acquisition procedure after expiration of a token of a user platform (administrator platform) for API use. FIG. 7 may be a flowchart illustrating the API information acquisition procedure of the user platform (or the administrator platform) using the token obtained through the procedure of FIG. 5 or FIG. 6. Here, the token may serve as a security key between the user platform (or the administrator platform 200) and the API authentication unit 132 of the central management server 130. The use of such a token may prevent vehicle information acquisition/vehicle control of a third party other than the service user (or the manager).

In the token acquisition procedure for API use, the user platform 200 may transmit the encrypted information composed of the customer ID, the time information, and the private key, the customer ID, and the time information to the API authentication unit 132 of the central management server 130 to request the token issuance. After the validity of the encrypted information is checked, the API authentication unit 132 of the central management server 130 may determine whether the received time information and the customer ID coincide with the user platform's information. When the determination is completed, the API authentication unit 132 of the central management server 130 may issue a token and transmit the issued token and the additional information (the current token, the expiration date, and next token information) to the corresponding user platform 200. In this token acquisition procedure, the customer ID and the private key are fixed values, and the private key is composed of a plurality, and is one of the entire private keys. The entire private key may be a value that is randomly generated when a new customer is registered, have a different value for each customer, and provided as a file format to the customer.

As shown in FIG. 6, in the new token acquisition procedure after expiring the used token for API use, the user platform 200 requiring the acquisition of the new token may transmit the encrypted information composed of the token information, the time information, and the private key, the existing token information, the token information to be used next, and the time information, to the API authentication unit 132 of the central management server 130 to request a new token issuance. After the validity of the encrypted information is checked, the API authentication unit 132 of the central management server 130 may determine whether the received time information and the token information to be used coincide with the user platform's information. When the determination is completed, the API authentication unit 132 of the central management server 130 may issue a new token and transmit the newly issued token and the additional information (the current token, the expiration date, and the next token information) to the corresponding user platform 200. Here, the update period of the token may be arbitrarily specified (e.g., 30 minutes, 15 days).

The corresponding user platform 200 requiring the API information acquisition may call the API to request vehicle control/data by transmitting the encrypted information composed of the time information, the token information, and the private key, the time information and the token information to the central management server 130. After the validity of the encrypted information is checked, the API authentication unit 132 of the central management server 130 may determine whether the received time information and the token information to be used coincide with the user platform's information. When the determination is completed, The API authentication unit 132 of the central management server 130 may call the corresponding API (the control execution, the control result and the data) and transmit the API to the corresponding user platform 200.

Figure 8:
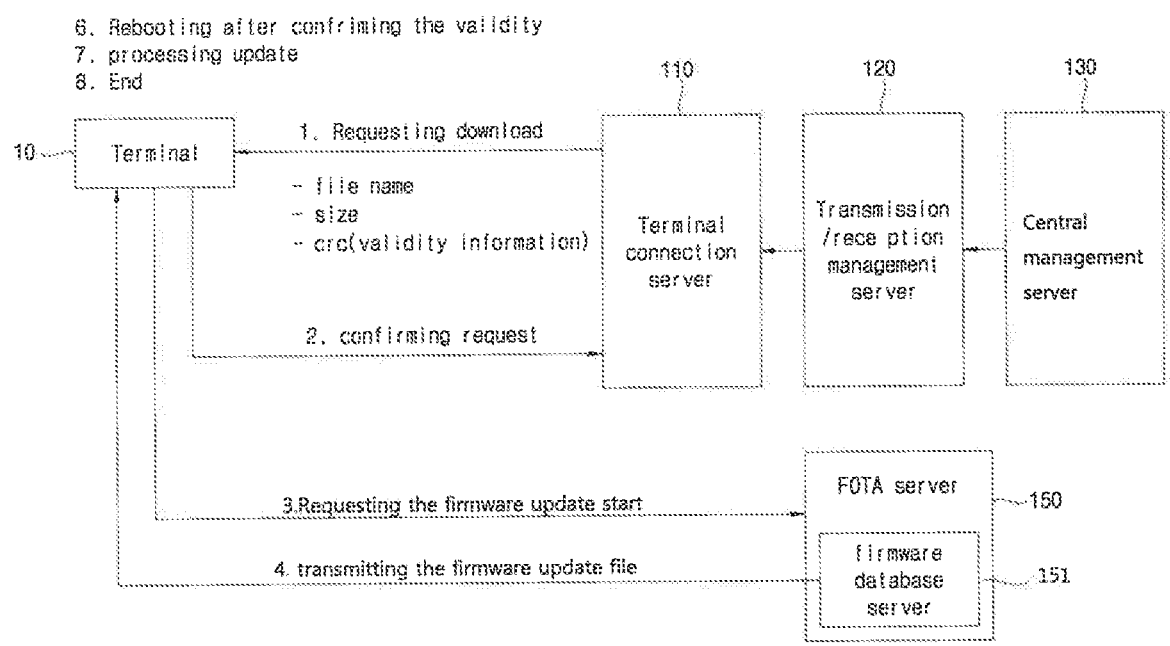
FIG. 8 is a diagram schematically illustrating a method of update the vehicle terminal using the FOTA server and the FOTA server.

FIG. 8 is a schematic diagram illustrating an updating procedure of the vehicle terminal using the FOTA server and the FOTA server 150. As shown in FIG. 8, an update request of the vehicle terminal may be issued from the central management server 130. The update request requested from the central management server 130 may be transmitted to the vehicle terminal 10 via the transmission/reception management server 120 and the terminal connection server 110.

The vehicle terminal 10 may request the FOTA server 150 to start the firmware update at the same time as confirming the update request (periodically requesting when it is not confirmed). The FOTA server 150 receiving the firmware update start request may transmit the firmware update file to the vehicle terminal 10 through the firmware database server 151. When the update file transfer is completed, the vehicle terminal 10 proceeds to reboot and update after confirming the validity.

If the validation fails (file corruption, omission, or disconnected during the connection), the firmware update request may be transmitted to the FOTA server 150 again, and then the firmware update file may be re-downloaded/resumed.

The present invention can be applied to a mobile communication service environment in which a packet service is supported regardless of 3G, LTE, GPRS (GSM) or CDMA, etc. According to the present invention, it is possible to maintain a connection at handoff between the base stations through the gateway server and ensure quick reconnection at the time of changing the mobile communication service network.

Also, the present invention can support encryption such as AES, DES, etc. for communication between the vehicle terminal and the gateway server. This encryption support enables to configure the communication between the gateway server and the control server by HTTPS or SSL, thereby providing the advantage of enabling perfect encryption transmission over the entire communication range for the service.

In addition, the present invention can have a structure that is easy to expand the service not only to domestic but also to foreign countries, while maintaining compatibility with existing systems. Therefore, the present invention provides an advantage that the rental car, the FMS, and the car sharing service company using the existing vehicle terminal can use the existing protocol between the vehicle terminal and the control server without modification.

Since the connection persistence can be maintained in an IP-based communication environment, it is possible to transmit and receive a large amount of multimedia data freely and smoothly, and to transmit various types of data such as multimedia data and binary data through high-data transmission.

While the present disclosure has been particularly shown and described with reference to exemplary embodiments thereof, it is to be understood that the disclosure is not limited to the disclosed exemplary embodiments, It will be understood by those skilled in the art that various changes in form and details may be made therein without departing from the spirit and scope of the disclosure as defined by the appended claims.

What is claimed is:

1. A connected gateway server system for real-time vehicle control service comprising:
   a vehicle terminal mounted on at least one vehicle;
   a gateway server relaying communication with the vehicle terminal;
   a connected gateway server for controlling a vehicle and acquiring a vehicle information in the form of REST API for each user through communication with the vehicle terminal, delivering a control command, a response information, and the vehicle information to the user's platform that has been validated as an API form, storing a terminal connection state information, an API authentication information, the vehicle information, and a user information, and performing a confirmation of update state and an update request of vehicle terminal; and
   a user platform for verifying validity in an API token manner by communication with the connected gateway server, fetching the necessary vehicle information in the API form or issuing the control command of vehicle,
wherein the connected gateway server includes a plurality of terminal connection servers for transmitting a connection state of the vehicle terminal or the vehicle information received from the vehicle terminal by a socket communication with a gateway server and a transmission/reception management server to the transmission/reception management server, or storing the information in a database server, the transmission/reception management server which is connected to a terminal connection server by the socket communication and is connected to a central management server by a HTTP communication, for transmitting the vehicle control command received from the central management server to the vehicle terminal through the terminal connection server, and for transmitting the collected vehicle data information to the central management server by collecting the response information of the vehicle data information and the control command from the terminal connection server, wherein the response information of the control command is used to check the normal or abnormal connection state by referring to the terminal connection state information of the database server, the central management server for transmitting the control command, the response information of the control command, and the vehicle data information through a validity authentication between the user platform and the transmission/reception management server in the form of API in both directions, the database server for receiving and storing the terminal connection state information, the API authentication information, the vehicle data information, and the user information through the terminal connection server and the central management server, and a FOTA server which includes a firmware database server and stores a firmware update file, for receiving the firmware update start request transmitted from the vehicle terminal and accordingly transmitting the firmware update file to the vehicle terminal through the firmware database server and performing the update of the terminal state confirmation, and
wherein the transmission/reception management server includes the tunnel server for transmitting the response information of control command to a push manager and transmitting the vehicle data information and the response information of control command through a API tunnel to a vehicle information transfer unit of the central management server by the HTTP communication, the push manager for confirming the normal or abnormal connection state by referring to the response information of control command received from the tunnel server and the terminal connection state information of the database server and transmitting the control command to the terminal connection server by the socket communication by transmitting the control command to the tunnel server according to a result of the connection state check, or attempting communication with the corresponding vehicle terminal using a spare control path, and the API tunnel for transmitting the vehicle data information and the response information of control command from the tunnel server to the vehicle information transfer unit of the central management server by the HTTP communication.

2. The connected gateway server system for real-time vehicle control service of claim 1, wherein the connected gateway server is configured by dispersing each server according to functions and purposes.

3. The connected gateway server system for real-time vehicle control service of claim 1, wherein the terminal connection server includes a connection manager which is connected to the gateway server by the socket communication to check the normal or abnormal connection state with the vehicle terminal, for storing or deleting the terminal connection state information to the database server and for transmitting the control command received from a tunnel server of the transmission/reception management server through the gateway server to the corresponding vehicle terminal by referring to the terminal connection state information of the database server, a receiver for transmitting the vehicle data information received from the vehicle terminal and the response information of control command by the socket communication to the tunnel server of the transmission/reception management server, and a sender for transmitting the vehicle data information received from the vehicle terminal and the response information of control command to the tunnel server of the transmission/reception management server by socket communication.

4. The connected gateway server system for real-time vehicle control service of claim 3, when a normal connection is established with the vehicle terminal, the connection manager records the terminal connection state information in the database server, transmits the connection state information to the tunnel server of the transmission/reception management server through the sender, and when the abnormal connection is established with the vehicle terminal, the connection manager deletes the connection state information of the database server.

5. The connected gateway server system for real-time vehicle control service of claim 1, wherein the central management server includes the vehicle information transferring unit for storing the vehicle data information transmitted from the tunnel server of the transmission/reception management server through the API tunnel of the database server, for transmitting the response information of control command that has been authenticated by the API authentication unit to the user platform directly, after the vehicle data information is transmitted from the vehicle terminal to the HTTP protocol of the central management server, the API authentication unit for performing API authentication of the response information to the control command transmitted to the HTTP protocol of the central management server and the control command transmitted from the user platform, and the vehicle command control unit for converting the vehicle control command transmitted from the user platform and authenticated by the API authentication unit into a terminal dedicated command and transmitting the command to the transmission/reception management server.

6. The connected gateway server system for real-time vehicle control service of claim 1, when the response information of control command is normal or the connection state information of the terminal presents in the database server, the push manager transmits the control command to the tunnel server and the control command to the terminal connection server by the socket communication, or when no connection state information of the corresponding terminal presents in the database server, the push manager attempts to communicate with the corresponding vehicle terminal using either the cloud message service or the short message service and when the response information of control command received from the tunnel server is abnormal, the push manager retries the connection to the tunnel server a predetermined number of times, or even if the connection is not made and the predetermined number of times exceeds, try to communicate with the corresponding vehicle terminal using either the cloud messaging service or the SMS message as any one of spare control processes.

7. The connected gateway server system for real-time vehicle control service of claim 1, wherein the user platform performs a token acquisition procedure and a new token acquisition procedure after the token expiration for using the API by communication with the connected gateway server and the procedure of acquiring the API information by using the token obtained through the token acquisition procedure.

8. The connected gateway server system for real-time vehicle control service of claim 7, wherein the token acquisition procedure of the user platform includes the step of that the user platform requiring the token acquisition sends the encrypted information composed of the customer ID, the time information, and the private key, the customer ID, and the time information together to the API authentication unit of the central management server, and transmits the time information to the API authentication unit of the central management server to request the token issuance, and the step of that the API authentication unit of the central management server determines whether the received time information and the customer ID coincide with the user platform's information after checking the validity of the encrypted information, and when the determination is completed, the API authentication unit of the central management server issues a token and transmits the issued token and the additional information (the current token, the expiration date, and next token information) to the corresponding user platform.

9. The connected gateway server system for real-time vehicle control service of claim 8, wherein the API information acquisition procedure of the user platform using the token acquired through the token acquisition procedure includes the step of that the corresponding user platform requiring the API information acquisition calls the API to request vehicle control data by transmitting the encrypted information composed of the time information, the token information, and the private key, the time information and the token information to the central management server, after checking the validity of the encrypted information, and the step of that the API authentication unit of the central management server determines whether the received time information and the token information to be used coincide with the user platform's information and when the determination is completed, the API authentication unit of the central management server calls the corresponding API (the control execution, the control result and the data) and transmits the API to the corresponding user platform.

10. The connected gateway server system for real-time vehicle control service of claim 7, wherein the new token acquisition procedure after expiring the used token includes the step of that the user platform requiring the acquisition of the new token transmits the encrypted information composed of the token information, the time information, and the private key, the existing token information, the token information to be used next, and the time information, to the API authentication unit of the central management server to request a new token issuance after checking the validity of the encrypted information, and the step of that the API authentication unit of the central management server determines whether the received time information match the token information to be used coincide with the user platform's information, and when the determination is completed, the API authentication unit of the central management server issues a new token and transmits the newly issued token and the additional information (the current token, the expiration date, and the next token information) to the corresponding user platform.

* * * * *